US 8,336,047 B2

(12) United States Patent
Van Hensbergen (10) Patent No.: US 8,336,047 B2
(45) Date of Patent: Dec. 18, 2012

(54) PROVISIONING VIRTUAL RESOURCES USING NAME RESOLUTION

(75) Inventor: Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/197,363

(22) Filed: Aug. 25, 2008

(65) Prior Publication Data

US 2010/0050173 A1    Feb. 25, 2010

(51) Int. Cl.
*G06F 9/455* (2006.01)
*G06F 9/46* (2006.01)
*G06F 15/173* (2006.01)

(52) U.S. Cl. .................... 718/1; 718/104; 709/226

(58) Field of Classification Search .................. 718/1
See application file for complete search history.

(56) References Cited

U.S. PATENT DOCUMENTS

| | | | |
|---|---|---|---|
| 6,023,712 A | 2/2000 | Spear | |
| 7,263,551 B2 | 8/2007 | Belfiore et al. | |
| 8,006,059 B1 * | 8/2011 | Clayton-Luce | 711/170 |
| 2002/0078000 A1 | 6/2002 | Davis et al. | |
| 2003/0074461 A1 * | 4/2003 | Kang et al. | 709/230 |
| 2005/0010924 A1 | 1/2005 | Hipp et al. | |
| 2005/0038708 A1 | 2/2005 | Wu | |
| 2005/0065937 A1 | 3/2005 | Degenaro et al. | |
| 2005/0138152 A1 | 6/2005 | Kruse | |
| 2005/0138187 A1 | 6/2005 | Breiter et al. | |
| 2005/0149372 A1 | 7/2005 | Kite et al. | |
| 2005/0228856 A1 | 10/2005 | Swildens et al. | |
| 2007/0067435 A1 | 3/2007 | Landis et al. | |
| 2007/0083662 A1 | 4/2007 | Adams et al. | |
| 2007/0180493 A1 | 8/2007 | Croft et al. | |
| 2007/0245116 A1 * | 10/2007 | Yamamoto et al. | 711/172 |
| 2007/0266136 A1 | 11/2007 | Esfahany et al. | |
| 2007/0294736 A1 | 12/2007 | Brady et al. | |
| 2008/0028143 A1 * | 1/2008 | Murase | 711/114 |
| 2008/0034365 A1 | 2/2008 | Dahlstedt | |
| 2008/0082983 A1 | 4/2008 | Groetzner et al. | |
| 2008/0123559 A1 | 5/2008 | Haviv et al. | |
| 2008/0162107 A1 | 7/2008 | Aniszczyk et al. | |
| 2008/0216082 A1 * | 9/2008 | Eilam et al. | 718/104 |
| 2008/0235702 A1 * | 9/2008 | Eilam et al. | 718/104 |
| 2009/0119672 A1 * | 5/2009 | Bussard et al. | 718/104 |
| 2009/0300605 A1 * | 12/2009 | Edwards et al. | 718/1 |

(Continued)

FOREIGN PATENT DOCUMENTS

WO    WO 2004 045149 A    5/2004

OTHER PUBLICATIONS

Anderson Silva, Using Virsh to Manage Your Virtual Machines in Red Hat Enterprise Linux, www.redhatmagazine.com, Jun. 18, 2008 (6 pgs).

(Continued)

*Primary Examiner* — Jennifer To
(74) *Attorney, Agent, or Firm* — Toler Law Group (57) ABSTRACT

A data string including a resource identifier and one or more resource attributes is parsed at a name resolution module and provided to a computing resource provisioning system. The computer resource provisioning system provisions a resource that corresponds to the resource identifier and that has the at least one. A handle is returned to provide access to the resource at a client system.

19 Claims, 10 Drawing Sheets

U.S. PATENT DOCUMENTS

2010/0011003 A1* 1/2010 Carver et al. .................... 707/10
2010/0011364 A1* 1/2010 Gerovac et al. ............... 718/104

OTHER PUBLICATIONS

E.N. Herness et al., WebSphere Application Server: a foundation for on demand computing, IBM Systems Journal, Jul. 2004 (6 pgs).

Using SOAPSonar to provision Amazon Elastic Compute Cloud (EC2), Cross Check Networks, www.crosschecknet.com, Jul. 8,2008 (9 pgs).

Round Robin DNS Load Balancing—WebsiteGear, www.websitegear.com, May 20, 2004 (4 pgs).

The Organisation of Information in the Directory, Understanding X.500—Chapter 2, (15 pgs).

K. Sollins and L. Masinter, Functional Requirements for Uniform Resource Names, rfc1737.txt, Network Working Group—Request for Comments: 1737, Xerox Corporation, Dec. 1994, (7 pgs).

K. Sollins, Architectural Principles of Uniform Resource Name Resolution, rfc2276.txt, Network Working Group—Request for Comments: 2276, MIT/LCS, Jan. 1998, (22 pgs).

M. Mealing and R. Daniels Jr., URI Resolution Services Necessary for URN Resolution, rfc2483.txt, Network Working Group—Request for Comments: 2483, Network Solutions, Inc. and Los Alamos National Laboratory, Jan. 1999, (15 pgs).

Steven Hill, Tutorial—Implementing Virtualization, www.networkcomputing.com, Aug. 28, 2007, (5 pgs).

Petersen et al., Working paper on Microsoft's Component Object Model (COM), Sep. 14, 1997, (6 pgs).

Dave A. Presotto et al., The Organization of Networks in Plan 9, Proc. of the Winter 1993 USENIX Conf., San Diego, CA (11 pgs).

M.A. Vouk, Cloud Computing—Issues, Research and Implementations, Proceedings of the ITI 2008 30th International Conference on Information Technology Interfaces, Jun. 23, 2008, Piscataway, New Jersey, (12 pgs).

International Search Report and Written Opinion of the International Searching Authority, International Application No. PCT/EP2009/060717, European Patent Office, Feb. 12, 2009, (11 pgs).

* cited by examiner

PROVISIONING VIRTUAL RESOURCES USING NAME RESOLUTION

I. FIELD

The present disclosure is generally related to provisioning virtual resources using name resolution.

II. BACKGROUND

In a computing environment, available physical resources may be allocated statically at the time the computing system is initially setup. For example, physical resources such as memory, processors, and disks may be installed into particular machines, and the particular machines assigned to particular users. The allocation process may be an out-of-band process that requires the user to specify resource requirements to an information technology department, which then allocates and provisions the system for the user. Re-provisioning resources typically requires a rebuild of the system, or the allocation of a new system with redefined resource requirements.

In a cloud computing environment, virtual resources are provisioned out-of-band in a manner similar to how physical resources are allocated in a conventional computing environment. For example, a user may request a virtual resource using a web interface. In response to the request, the user may receive access information for the virtual resource, such as an internet protocol (IP) address associated with a new virtual resource, a logical identifier associated with the new virtual resource, or a network location of a virtual disk. The user may then use the virtual resource by updating user commands to include access information to the virtual resource before running the user commands or by configuring a system to include access information to the virtual resource before rebooting the system.

III. BRIEF SUMMARY

A system and method for provisioning virtual resources using name resolution is disclosed. In a particular embodiment, the method includes receiving an instruction and a data string at an interface to a computing system. The data string includes a resource identifier and one or more resource attributes. The method includes parsing the data string to extract the resource identifier and the one or more resource attributes. The method also includes providing the resource identifier and the one or more resource attributes to a computing resource provisioning system. The computer resource provisioning system provisions a resource that corresponds to the resource identifier and that has the one or more resource attributes. The method also includes returning a handle to provide access to the provisioned resource during execution of the instruction at a client system coupled to the interface to the computing resource provisioning system.

In another particular embodiment, a method includes provisioning a virtual resource of a cloud computing system in response to receiving a command including a name resolution request.

In another particular a system includes a command interface to receive a user command that includes a data string argument. The system includes a name resolution module to parse a resource identifier and one or more resource attributes from the data string argument. The system also includes a provisioning system interface to send a request to a provisioning system to create a resource having the one or more resource attributes and to return a handle to the resource to the name resolution module.

In another particular embodiment, a computer program product includes a computer readable medium. The computer readable medium includes first program instructions to receive an instruction and a data string, the data string including a resource identifier and one or more resource attributes. The computer readable medium also includes second program instructions to generate a request to a cloud computing system to create a virtual resource having the one or more resource attributes. The computer readable medium also includes third program instructions to enable access to the virtual resource using the resource identifier. The first program instructions, the second program instructions, and the third program instructions are stored on the computer readable medium.

V. DETAILED DESCRIPTION

Figure 1:
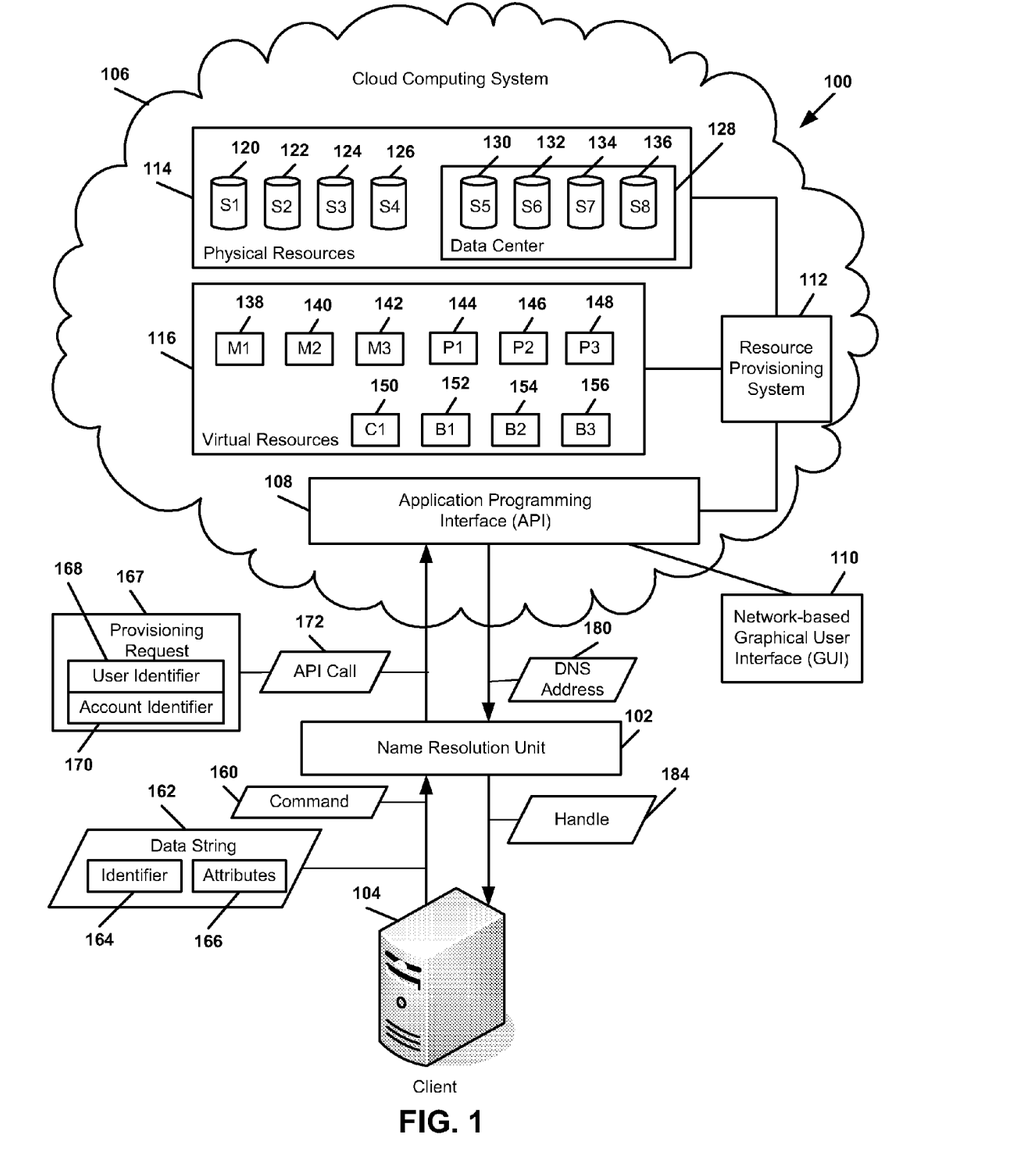
FIG. 1 is a general diagram of a first embodiment of a system to provision virtual resources using name resolution.

FIG. 1 depicts a particular embodiment of a system 100 to provision virtual resources using name resolution. The system 100 includes a name resolution unit 102 coupled to a client 104 and coupled to a cloud computing system 106.

The cloud computing system 106 includes an interface, such as an application programming interface (API) 108, coupled to a network-based graphical user interface (GUI) 110 and coupled to a resource provisioning system 112. The provisioning system 112 has access to physical resources 114 and virtual resources 116. The virtual resources 116 are associated with at least one available physical resource of the physical resources 114. The physical resources 114 include representative servers S1 120, S2 122, S3 124, and S4 126 and a representative data center 128. The representative data center 128 includes representative servers S5 130, S6 132, S7 134, and S8 136. The virtual resources 116 include representative virtual memories M1 138, M2 140, and M3 142, representative virtual processors P1 144, P2 146, and P3 148, representative virtual bandwidth B1 152, B2 154, and B3 156, and a representative newly created virtual resource C1 150. The representative newly created virtual resource C1 150 may be a virtual memory unit, a virtual processor unit, a virtual bandwidth unit, other virtual resource, or any combination thereof. For example, the cloud computing system 106 may include multiple processors of the servers S1 120, S2 122, and S3 124 that are logically mapped to virtual processing resources P1 144, P2 146, and P3 148, that are accessible to users on an on-demand basis. The virtual resources 116 may be subdivisions of existing physical processors, disks, or memories of servers of the physical resources 114. For example, one or more of the virtual resources 116 may be created by subdividing a portion of the physical resources 114 in response to user demand.

The physical resources 114 include multiple networked computer systems that are accessible to subscribers, such as the client 104, on an on-demand basis. The representative data center 128 may be physically located at a different location than the representative servers 120, 122, 124, and 126. The client 104 is configured to execute software program instructions to perform various functions that make use of one or more of the virtual resources 116. The virtual resources 116 are mapped to the physical resources 114. The virtual resources 116 may include a logical processing resource that is associated with at least one physical processing unit at a multi-processing unit computer system, such as the physical resources 114. Each logical memory resource may be associated with at least one physical storage device.

The resource provisioning system 112 is configured to respond to provisioning requests, such as requests sent via an application programming interface (API) call 172, by dynamically assigning the physical resources 114. A provisioning request 167, including a user identifier 168 and an account identifier 170, is provided to the resource provisioning system 112 via the application programming interface (API) 108 of the resource provisioning system 112. The API 108 is configured to receive provisioning requests from the network-based GUI 110. For example, the network-based GUI 110 may include one or more web forms to collect user input data and to display results corresponding to provisioning of a virtual resource. The results corresponding to provisioning the virtual resource may include a domain name system (DNS) address 180 to enable access to the provisioned virtual resource. In a particular embodiment, the results corresponding to provisioning the virtual resources may include a port number (not shown).

The client 104 is configured to access the virtual resources 116 via the name resolution unit 102. The name resolution unit 102 enables real-time provisioning of resources to be used by the client 104 during execution of software program instructions. Thus, the name resolution unit 102 enables the client 104 to use resources without having to separately allocate and provision the resources before using them. For example, when a software program instruction indicates to store a file at a disk identified as "mydisk" that has a capacity of thirty gigabytes, the name resolution unit 102 determines whether there is a disk called "mydisk" of thirty gigabytes. When "mydisk" exists and has a capacity of thirty gigabytes, the name resolution unit 102 returns the handle 184. When "mydisk" exists and has a capacity different than thirty gigabytes, the name resolution unit 102 sends a request to the cloud computing system 106 to re-provision "mydisk" to have a capacity of thirty gigabytes, and returns the handle 184. When "mydisk" does not exist, the name resolution unit 102 sends a request to the cloud computing system 106 to provision a disk with the identifier "mydisk" and a capacity of thirty gigabytes and returns the handle 184.

The name resolution unit 102 may use regular expression rules to identify the identifier 164 and the attributes 166 of the data string 162. The name resolution unit 102 is configured to generate the API call 172 to request the cloud computing system 106 to provision one or more virtual resources. The name resolution unit 102 is further configured to receive the DNS address 180 used to access a newly provisioned resource of the cloud computing system 106. The name resolution unit 102 is further configured to return the handle 184 that maps the newly provisioned virtual resource to a user-identified name, such as the identifier 164 in the data string 162. The name resolution unit 102 may be integrated into an operating system of the client 104, may be external to the client 104, or any combination thereof.

In operation, the client 104 receives a command 160 and a data string 162 for execution and forwards the command 160 and the data string 162 to the name resolution unit 102 for resolution. The data string 162 includes a resource identifier 164 and resource attributes 166. In an illustrative embodiment, the data string is a path to the resource. The name resolution unit 102 receives the command 160 and the data string 162 from the client 104. The command 160 may be an instruction associated with one of the virtual resources 116, such as a store instruction, a retrieve instruction, or a modify instruction. The name resolution unit 102 parses the data string 162 to extract the resource identifier 164 and the resource attributes 166.

The name resolution unit 102 determines whether the data string 162 references a previously provisioned resource. When the data string 162 references a previously provisioned resource, the name resolution unit 102 returns a handle 184. The handle 184 enables the client 104 to access the previously provisioned resource referenced by the data string 162. When the data string 162 does not reference a previously provisioned resource, the name resolution unit 102 generates a request to the cloud computing system 106 to provision a new virtual resource. In a particular embodiment, the request is an application programming interface (API) call 172 that bypasses the network-based GUI 110. The API call 172 may include context information related to the command 160, such as a user identifier 168 or an account identifier 170. The user identifier 168 and the account identifier 170 may be used to track virtual resource usage information for billing purposes. For example, the user identifier 168 may be used to keep track of an individual user's usage of virtual resources. The account identifier 170 may be used to keep track of a set of users' usage of virtual resources.

The cloud computing system 106 provisions and allocates the requested virtual resource and returns the DNS address 180 to enable access to the virtual resource to the name resolution unit 102. The name resolution unit 102 associates the DNS address 180 with the handle 184 and returns the handle 184 to the client 104 to enable the client 104 to access the newly provisioned virtual resource via the handle 184.

Within the cloud computing system 106, the resource identifier 164 and the resource attributes 166 are received at the resource provisioning system 112 via the API 108. The resource provisioning system 112 provisions the newly provisioned resource C1 150 that corresponds to the resource identifier 164 and that has the resource attributes 166. For example, when the resource identifier 164 and the resource attributes 166 identify a server with a particular capacity, the representative newly provisioned resource C1 150 is provisioned as a virtual server having the particular capacity. To illustrate, when the resource identifier 164 is "mydisc" and the resource attributes 166 is six terabytes, the representative newly provisioned resource C1 150 is a virtual server with a six terabyte capacity that is referenced as "mydisc". When the resource identifier 164 and the resource attributes 166 identify a processor "cpu10k" with a capacity often thousand floating point operations per second (FLOPS), the representative newly provisioned resource C1 150 is a virtual processor with a capacity of ten thousand FLOPS that is referenced as "cpu10k". When the resource identifier 164 and the resource attributes 166 identify a memory "mem100M" with a capacity of one hundred megabytes, the representative newly provisioned resource C1 150 is a virtual memory with a capacity of one hundred megabytes that is referenced as "mem100M".

In response to making the API call 172 via the API 108, the name resolution unit 102 receives a domain name system (DNS) address 180 to access the resource C1 150. The name resolution unit 102 stores the DNS address 180 and associates the DNS address 180 with the handle 184. The name resolution unit 102 returns the handle 184 to enable the client 104 to access the resource C1 150 during execution of the command 160. The handle 184 may include context information for the command 160, such as the user identifier 168 or the account identifier 170 as environment variables to further distinguish virtual resources, such as when multiple users may duplicate virtual resource names.

After the resource C1 150 has been provisioned, the data string 162 may be resolved to access the resource C1 150 via the handle 184. When the data string 162 is subsequently encountered by the client 104, such as in a later instruction in the software program executed at the client 104, the name resolution unit 102 performs a lookup operation using the handle 184 to retrieve the DNS address 180.

Thus, the resource provisioning system 112 provisions the virtual resource C1 150 of the cloud computing system 106 in response to the command 160 that triggers a name resolution request to the name resolution unit 102, such as by including the data string 122 as an argument to the command 160, and the resource provisioning system 112 provisions the virtual resource C1 150 during a runtime execution of the command 160 at the client 104. A name of a resource, such as a name based on the identifier 164 and the attribute 166 of the virtual resource C1 150, are received at the cloud computing system 106 via the application programming interface (API) 172 in response to the command 160 that triggers a name resolution request. The cloud computing system 106 receives the name and the attribute 166 of the resource independent of the network-based GUI 110, avoiding any manual provisioning steps. The name resolution unit 102 resolves the name resolution request by returning the handle 184 to the virtual resource C1 150. The handle 184 can be used by the client 104 to complete execution of the command 160. Thus, the system 100 enables the client 104 to execute a command 160 having the data string 162 as its argument even when the data string 162 does not reference a resource that was provisioned prior to execution of the command 160.

To illustrate, a library interface may be provided to enable dynamic resource provisioning. For example, the command:

R=dial("cloud!storage:mydisk!capacity=2 GB)

includes a command "dial", a data string "cloud!storage: mydisk!capacity=2 GB" having the attribute "storage", the capacity "2 GB", and the identifier "mydisk". In this example, the resource is two gigabytes of virtual memory. The name resolution unit 102 recognizes that "cloud" references a virtual memory resource in the cloud computing system 106 that has a capacity of 2 GB. The name resolution unit 102 may return "/dev/sda1" as a handle to the virtual memory resource when virtual memory resources are available and may return an error when virtual memory resources are not available.

As another illustration, an alternate file system interface may be provided to enable dynamic resource provisioning. For example, the command:

capacity=20 GB>/cloud/storage/mydisk/clone includes a redirect command ">", a data string "cloud/storage/mydisk/clone" having the attribute "storage" and the identifier "mydisk". The file system interface command "capacity" indicates that the capacity of the virtual resource is "20 GB". When the virtual memory resource "clone" does not exist prior to execution of the command, a virtual memory resource with twenty gigabytes is provisioned with the name "clone" and dynamically allocated for the command to use. When the virtual memory resource "clone" has a capacity different than twenty gigabytes, the virtual memory resource "clone" may be re-provisioned to have a capacity of twenty gigabytes. In another example of an alternate file system interface, the user input:

cd/cloud/storage/mydisk/capacity=2 GB includes a change directory command "cd", a data string "cloud/storage/mydisk/capacity=2 GB" having the attribute "storage", the capacity "2 GB", and the identifier "mydisk". When the virtual memory resource "mydisk" does not exist prior to execution of the command, a virtual memory resource with two gigabytes is provisioned with the name "mydisk" and allocated for the command to use. When the virtual memory resource "mydisk" has a capacity different than two gigabytes, the virtual memory resource "mydisk" may be re-provisioned to have a capacity of two gigabytes.

As a third illustration, a network interface may be provided to enable dynamic resource provisioning. For example, Ssh cloud!cpu:newsys!x86,linux,mem=4 GB,cpus=4 includes a remote login command "Ssh", a data string "cloud!cpu:newsys!x86,linux,mem=4 GB,cpus=4" having the identifier "newsys" and the attributes "x86", "linux", "mem", and "cpus". The data string indicates that the newsys system uses x86-based processors, runs a linux-based operating system, has four gigabytes of memory, and has four virtual central processing units (CPUs).

The system 100 enables a user of the cloud computing system 106 to avoid the step (often a manual step) of provisioning a resource before using the resource because the system enables "on-the-fly" dynamic provisioning. The system 100 enables provisioning and use of virtual resources at runtime while eliminating the need for out-of-band provisioning using the GUI 110, by sending requests to the provisioning system 112 independent of a graphical user interface. The dynamic provisioning may be enabled using a universal resource name (URN) that contains a name meaningful to the user and that identifies sufficient attributes to allow for provisioning of the resource when the resource is not previously provisioned. When a URN references an un-provisioned resource, the resource is provisioned with the attributes and name of the URN. The dynamic provisioning may be transparent to the clients in that the dynamic provisioning may take place without the clients being aware that a resource was provisioned in response to a reference to a previously non-existent resource. The URN may be combined with additional context-related information, such as a user identity or a logical system identity, to enable billing for use of the resource.

The user identity or logical system identity may be associated with a billing model that permits billing based on usage time, provisioned bandwidth, provisioned memory, or provisioned processing power. Each user identity or logical system identity may have restrictions to restrict or limit the number of resources that can be provisioned. For example, an employer may restrict the maximum number of resources each employee can use at a given time to ensure that the amount of resources used by employees do not exceed a budgeted amount.

Figure 2:
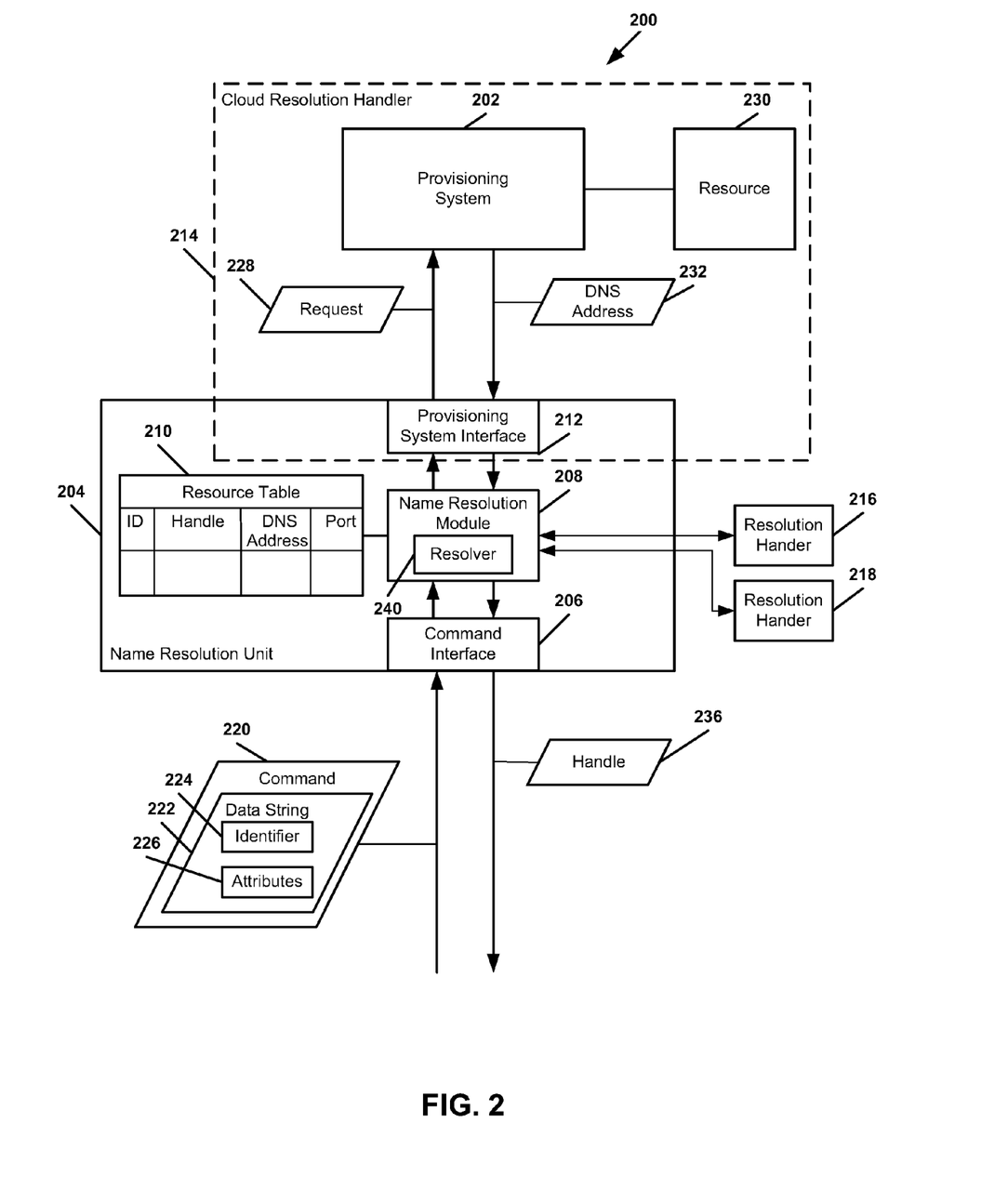
FIG. 2 is a block diagram of a second embodiment of a system to provision virtual resources using name resolution.

FIG. 2 is a block diagram of a particular embodiment of a system 200 to provision virtual resources using name resolution. The system 200 includes a provisioning system 202 coupled to a name resolution unit 204. The provisioning system 202 is coupled to a representative resource 230. A first resolution handler 216 and a second resolution hander 218 are coupled to the name resolution unit 204. In a particular embodiment, the name resolution unit 204 is the name resolution unit 102 in FIG. 1.

The name resolution unit 204 includes a command interface 206, a name resolution module 208, a resource table 210, and a provisioning system interface 212. The command interface 206 is configured to receive a user command 220 that includes a data string 222 as an argument to the user command 220. The name resolution module 208 is configured to parse the data string 222 to retrieve a resource identifier 224 and a resource attributes 226 from the data string 222. The name resolution module 208 is configured to determine whether the resource attributes 226 references a resource in the resource table 210.

The name resolution nodule 208 includes a resolver 240 that is configured to use regular expression rules to identify at least a first portion of the data string 222, and to forward at least a second portion of the data string 222 that is not identified by the resolver 240 to a resolution hander. For example, the resolver 240 may be configured to access the first resolution hander 216 to resolve file system identifiers, the second resolution handler 218 to resolve domain name system (DNS) identifiers, and a cloud resolution handler 214 that includes the provisioning system interface 212 in communication with the provisioning system 202 to resolve cloud or virtual resource identifiers. As an example, if the resolver 240 determines that a first portion of the data string 222 includes the term "cloud," the resolver 240 may be configured to send the remainder of the data string 222, or the entire data string 222, to the cloud resolution hander 214.

When the resource attributes 226 does not reference a virtual resource identified in the resource table 210, the provisioning system interface 212 is configured to send a request 228 to the provisioning system 202 to create the resource 230. The provisioning system 202 creates the resource 230 with the resource attributes 226 and associates the resource identifier 224 with the resource 230. For example, when the resource attributes 230 is four gigabytes of memory and the resource identifier 224 is "mem1", the provisioning system 202 creates a memory having four gigabytes of memory and associates the name "mem1" with the created resource. In an illustrative embodiment, the resource attributes 226 may specify a capacity of a virtual memory device, a throughput of a virtual processor device, or a throughput of a virtual bandwidth.

The provisioning system interface 212 is configured to receive a DNS address 232 from the provisioning system 202. The DNS address 232 enables access to the resource 230. The provisioning system interface 212 is configured to associate a handle 236 with the DNS address 232 to enable access to the resource 230. The handle 236 is returned to the name resolution module 208. The name resolution module 208 uses a table entry of the resource table 210 to associate the handle 236 with the DNS address 232.

When the resource attributes 226 references an entry in the resource table 210, the name resolution module 208 is configured to perform a lookup operation at the resource table 210 using the resource attributes 226 to retrieve the handle 236 associated with the resource attributes 226. When the resource 230 was previously provisioned and the resource attributes 226 does not match the attributes of the resource 230, the provisioning system interface 212 is further configured to send a request 228 to modify the resource 230 that is associated with the resource identifier 224 by re-provisioning the resource 230. For example, when the resource 222 is a virtual processor having a particular number of processing units and the resource attributes 226 indicates a different number of processing units associated with the resource 230, the provisioning system interface 212 is configured to send the request 228 to modify the resource 230 to have the number of processing units as specified by the resource attributes 226.

The system 200 enables a client to execute a command 220 having the data string 222 as its argument even when the data string 222 does not reference a resource that exists prior to execution of the command 220. The name resolution module 208 determines whether the data string 222 references a provisioned resource by performing a lookup operation at the resource table 210. When the data string 222 does not reference a provisioned resource in the resource table 210, the provisioning system interface 212 sends the request 228 to the provisioning system 202 to provision the resource. The provisioning system 202 creates the requested resource (not shown) and returns information used to access the newly provisioned resource. The name resolution module 208 associates the information to access the newly provisioned resource with a handle 236 that enables a client to access the newly provisioned resource and returns the handle 236 to the client. When the client subsequently references the provisioned resource, the name resolution module 208 performs a lookup using the resource table 210 to retrieve the handle used to access the resource.

The system 200 enables "on demand" dynamic provisioning that creates a virtual resource in response to executing a command referencing a resource that cannot be resolved by a lookup of the resource in the resource table 210. In addition, the system 200 enables "on the fly" dynamic re-provisioning that re-provisions a resource when a command referencing the resource indicates that the resource has an attribute different than the current attribute of the resource. For example, the resource 230 may initially be provisioned to have two hundred gigabytes of memory capacity. During execution of the command 220, when the attribute 226 indicates that the resource 230 has two terabytes of memory capacity, name resolution unit 204 determines that the resource 230 does not currently have two terabytes of memory capacity and sends the request 228 to re-provision the resource 230 accordingly.

Figure 3:
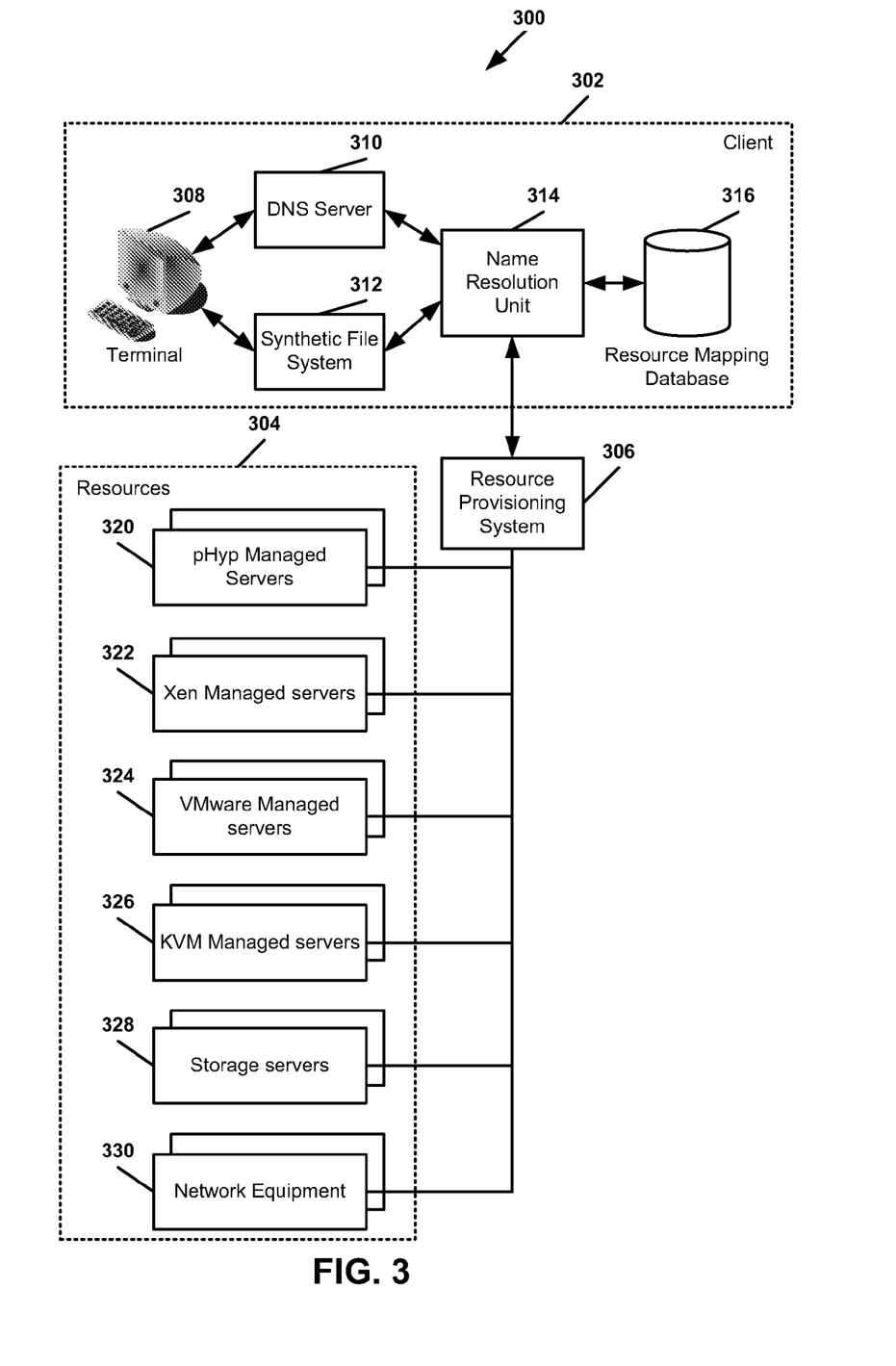
FIG. 3 is a block diagram of a third embodiment of a system to provision virtual resources using name resolution.

FIG. 3 is a block diagram of a particular embodiment of a system 300 to provision virtual resources using name resolution. In the system 300, a client 302 is coupled to resources 304 via a resource provisioning system 306. The client 302 includes a terminal 308, a domain name server (DNS) 310, a synthetic file system 312, a provisioning and name resolution unit 314 and a resource mapping database 316. The resources 304 include various types of managed servers, including power hypervisor (pHyp) managed servers 320, Xen managed servers 322, VMware managed servers 324, Kernel-based Virtual Machine (KVM) managed servers 326, storage servers 328, and network equipment 330.

The terminal 308 is configured to access virtual resources via the DNS server 310 and the synthetic file system 312. When the DNS server 310 or the synthetic file system 312 attempt to access a virtual resource, the provisioning and name resolution unit 314 is configured to determine whether the virtual resource has been provisioned. When the virtual resource has been provisioned, the provisioning and name resolution unit 314 performs a lookup for a handle to enable access to the virtual resource at the resource mapping database 316 and returns the handle to the DNS server 310 or the synthetic file system 312. When the virtual resource has not been provisioned, the provisioning and name resolution unit 314 is configured to send a request to provision the virtual resource to the resource provisioning system 306. The resource provisioning system 306 receives the provisioning request and provisions a virtual resource of the resources 304 and then returns information, such as a DNS identifier, to enable access to the virtual resource. The name resolution unit 314 receives the information from the resource provisioning system 306, associates a handle with the information, stores the handle and the information in the resource mapping database 316, and returns the handle to the DNS server 310 or to the synthetic file system 312.

Figure 4:
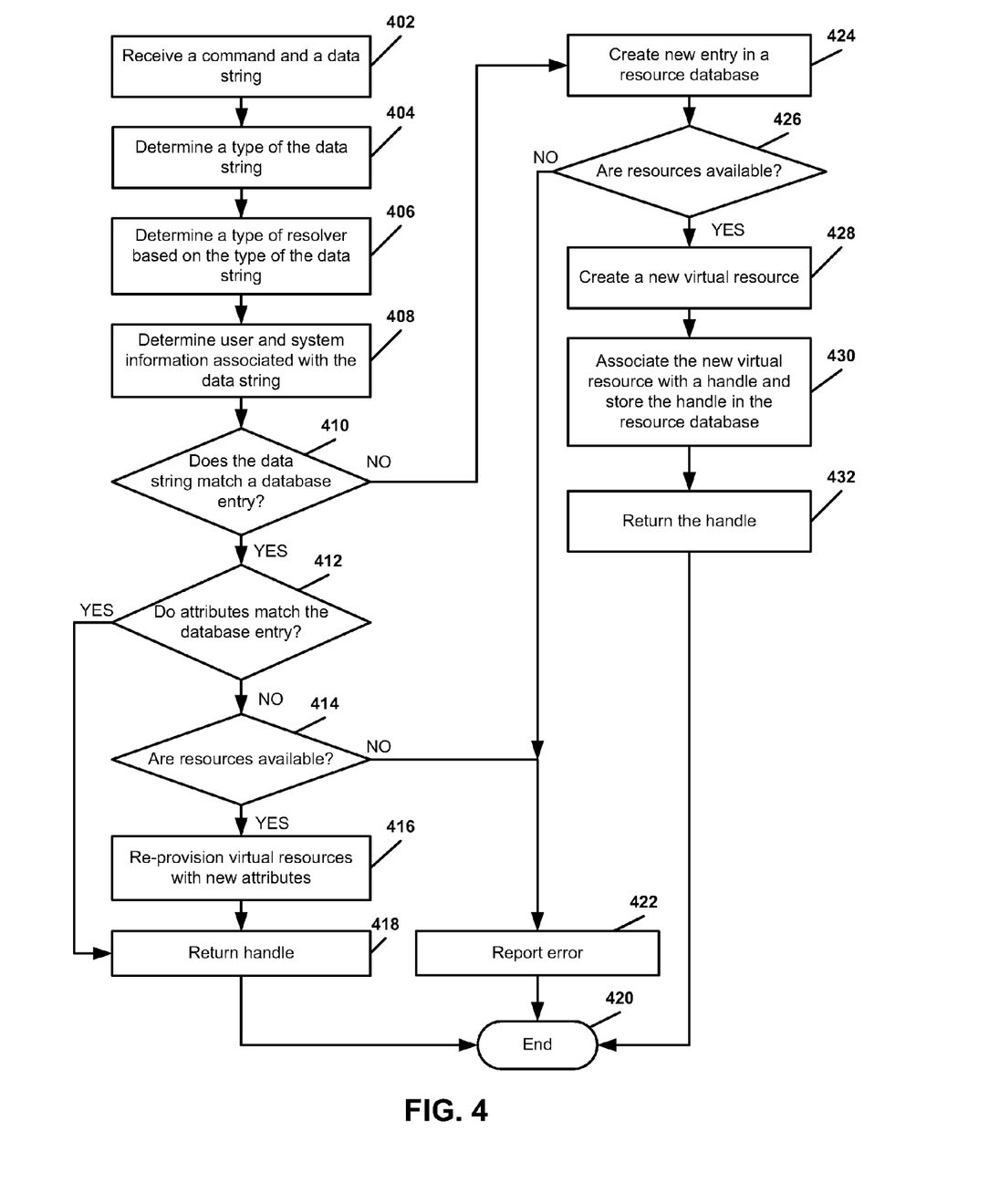
FIG. 4 is a flow diagram of a first illustrative embodiment of a method to provision virtual resources using name resolution.

FIG. 4 is a flow diagram of a first illustrative embodiment of a method to provision virtual resources using name resolution. The method may be performed by a resolver system, such as the name resolution unit 102 in FIG. 1, the name resolution unit 204 in FIG. 2, or the name resolution unit 314 in FIG. 3.

A command and a data string are received at 402. Moving to 404, a type of the data string is determined. Continuing to 406, a type of resolver is determined based on the type of the data string. For example, each type of data string may have its own associated resolver. In an illustrative embodiment, a first resolver is used to resolve a first data string associated with a memory resource, a second resolver is used to resolve a second data string associated with a processor resource, and a third resolver is used to resolve a third data string associated with a bandwidth resource. Advancing to 408, user and system information associated with the data string is determined. The user and system information associated with the data string include information related to the context within which the command and data string are executed and may be used to distinguish resource requests when more than one user references the same resource. For example, when multiple users access a common virtual resource, the user and system information may be used to distinguish requests from the different users to access the common virtual resource.

Proceeding to 410, a determination is made whether the data string matches an existing database entry. For example, where the data string 222 in FIG. 2 matches a data string in the resource table 210, the referenced resource has already been provisioned and the name resolution unit 204 can return the corresponding handle from the resource table 210. Where the data string matches a database entry, a determination is made at 412 whether attributes of the data string match the database entry. The data string matches a database entry when the resource was previously provisioned.

Where the attributes match the database entry at 412, a handle is returned, at 418, and the method ends at 420. Where the attributes do not match the database entry, at 412, a determination is made whether the resources are available at 414. When the attributes do not match the database entry, at attempt is made to re-provision the resource to have the attributes. Where the resources are not available, at 414, an error is reported at 422, and the method ends, at 420.

Where the resources are available at 414, the method proceeds to 416. At 416, the virtual resources are re-provisioned with new attributes, the handle is returned, at 418, and the method ends, at 420. Where the data string does not match the database entry at 410, the method proceeds to 424. For example, in FIG. 2, where the data string 212 does not match an entry in the resource table 210, the name resolution unit 204 sends a request to the provisioning system 202 to provision the resource referenced by the data string 212. At 424, a new entry is created in a resource database. Proceeding to 426, a determination is made whether the resources are available. For example, the resources may be virtual resources, such as processing power, memory, hard disk space, bandwidth, other computing-related resources, or any combination thereof. Where the resources are not available, at 426, an error is reported, at 422, and the method ends at 420. Where the resources are available, at 426, a new virtual resource is created, at 428. Advancing to 430, the new virtual resource is associated with a handle and the handle is stored in the resource database. Moving to 432, the handle is returned and the method ends, at 420.

Figure 5:
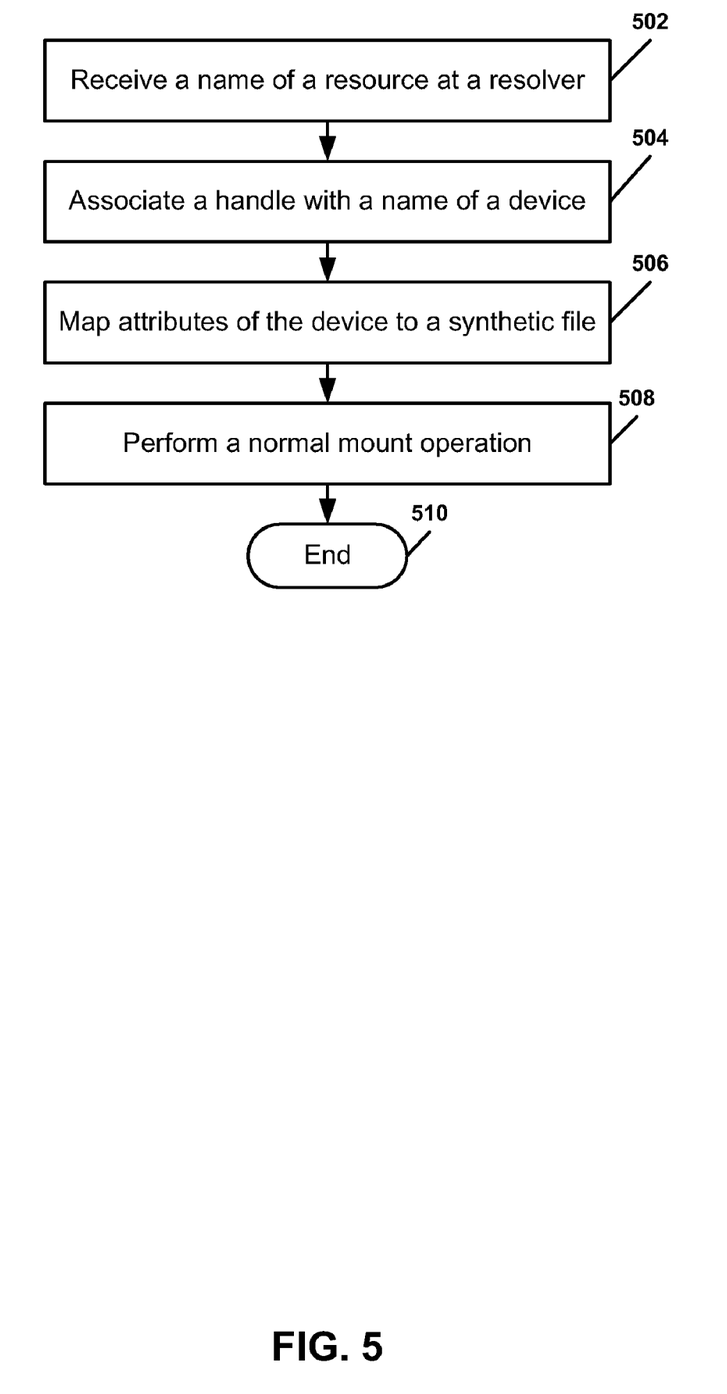
FIG. 5 is a flow diagram of a second illustrative embodiment of a method to provision virtual resources using name resolution.

FIG. 5 is a flow diagram of a second illustrative embodiment of a method to provision virtual resources using name resolution. The method may be performed by a resolver system, such as the name resolution unit 102 in FIG. 1, the name resolution unit 204 in FIG. 2, or the name resolution unit 314 in FIG. 3.

A name of a resource is received at a resolver, at 502. Moving to 504, a handle is associated with a name of a device. In one illustrative embodiment, the resolver may request that a resource be provisioned and assigned the received name. The resolver may receive the provisioned resource and associate a handle with the name of the provisioned resource. In another illustrative embodiment, the resolver may perform a lookup to retrieve a handle for the name associated with the resource. Continuing to 506, attributes of the device are mapped to a synthetic file. A synthetic file system provides a file system interface, enabling software programs to use simple file operations without having to interact with the underlying protocols. Advancing to 508, a normal mount operation, preparing the resource for use, is performed. For example, when a mount operation is performed on a disk drive, the file system of the disk drive is made available to the operating system. The method ends at 510.

Figure 6:
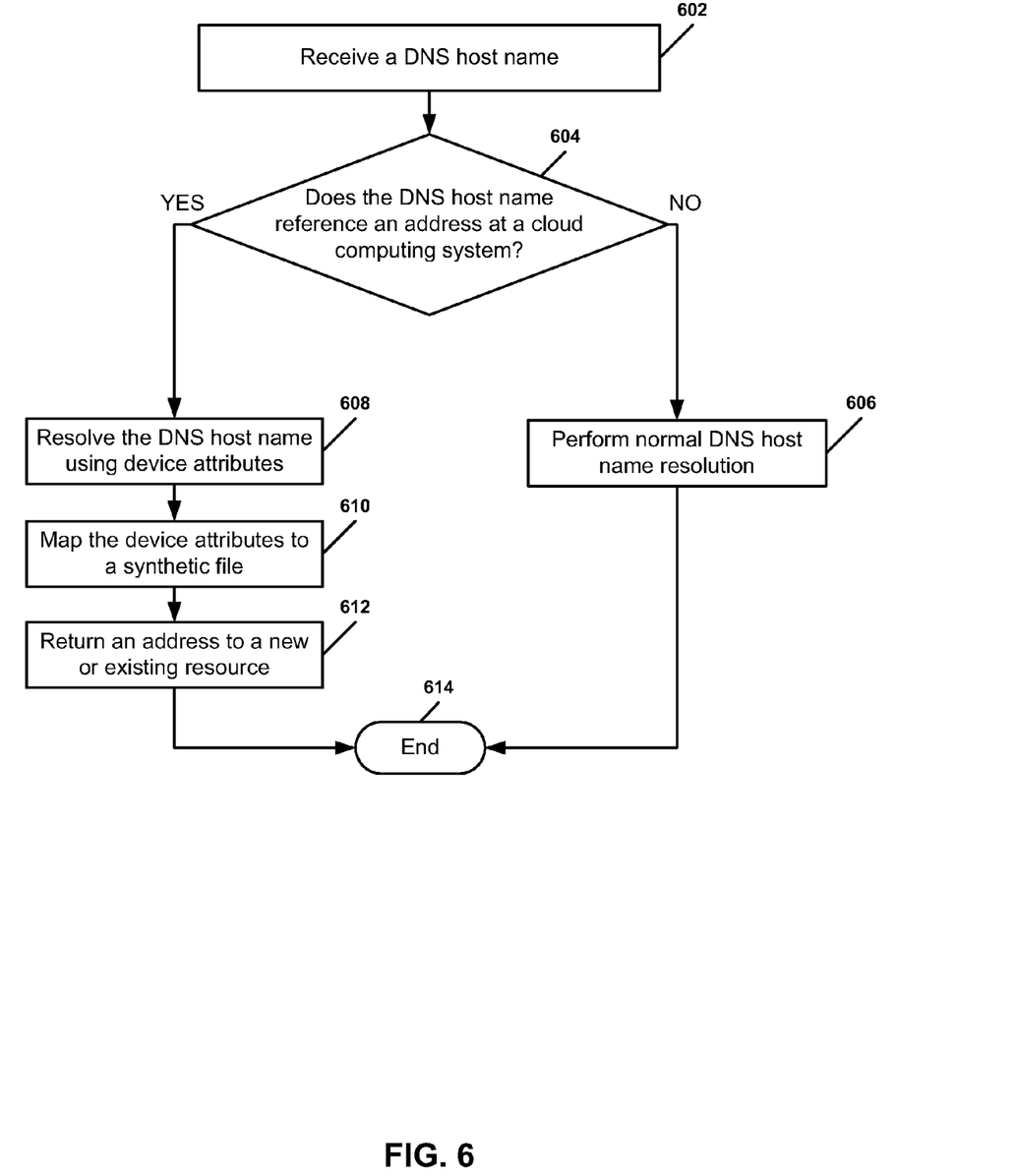
FIG. 6 is a flow diagram of a third illustrative embodiment of a method to provision virtual resources using name resolution.

FIG. 6 is a flow diagram of a third illustrative embodiment of a method to provision virtual resources using name resolution. The method may be performed by a DNS server, such as the DNS server 310 of FIG. 3.

A DNS host name is received, at 602. Proceeding to 604, a determination is made whether the DNS host name references a cloud address at a cloud computing system. Where the DNS host name does not reference an address at a cloud computing system, a normal DNS host name resolution is performed at 606, and the method ends at 614. Where the DNS host name references a cloud computing system, at 606, the DNS host name is resolved using device attributes, at 608. Continuing to 610, the device attributes of the virtual resource are mapped to a synthetic file. Moving to 612, an address is returned to a new or existing resource, and the method ends, at 614.

Figure 7:
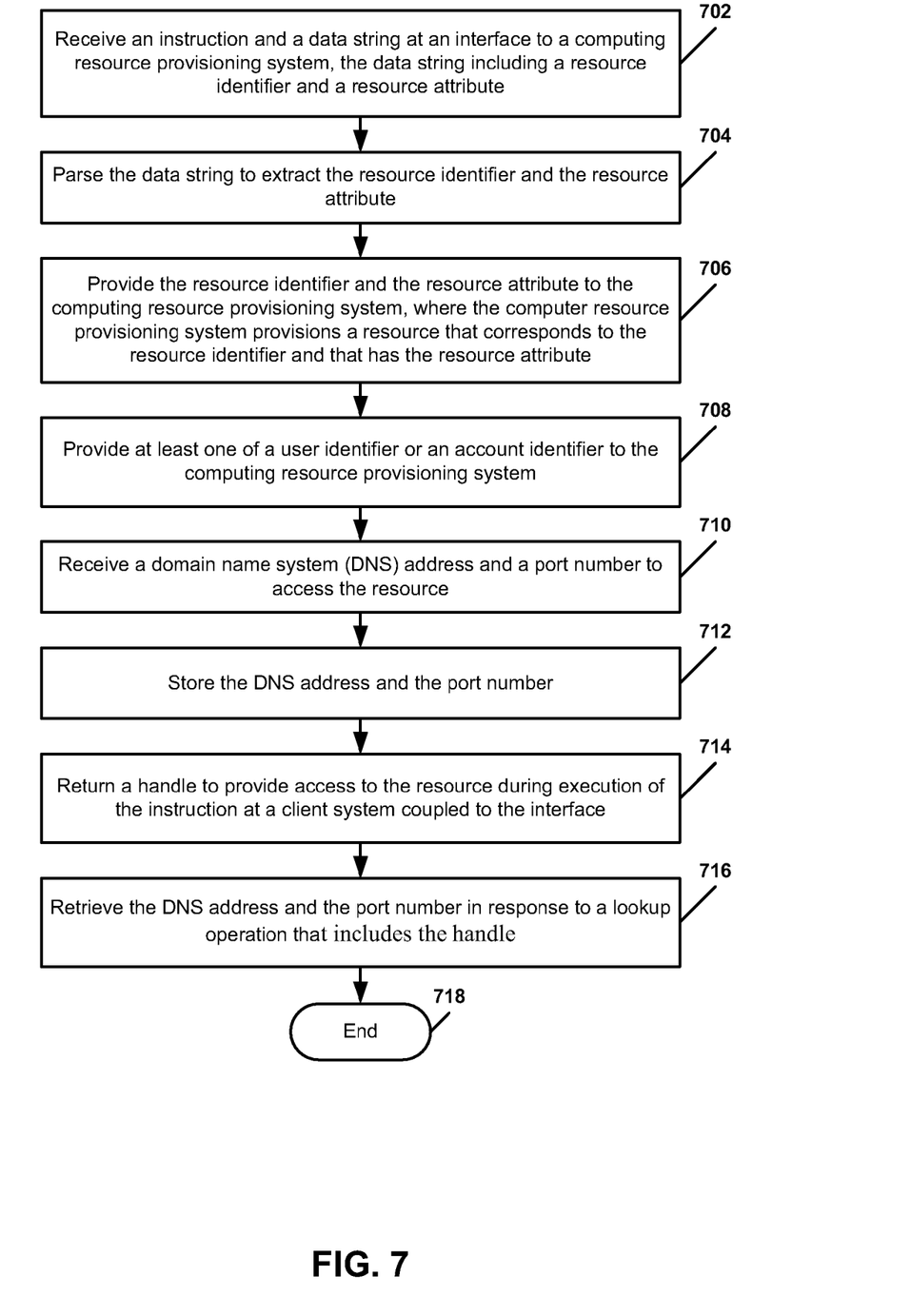
FIG. 7 is a flow diagram of a fourth illustrative embodiment of a method to provision virtual resources using name resolution.

FIG. 7 is a flow diagram of a fourth illustrative embodiment of a method to provision virtual resources using name resolution. At 702, an instruction and a data string are received at an interface to a computing resource provisioning system, where the data string includes a resource identifier and one or more resource attributes. For example, the interface may be the application programming interface (API) 108 of FIG. 1. Continuing to 704, the data string is parsed to extract the resource identifier and the one or more resource attributes. Moving to 706, the resource identifier and the one or more resource attributes are provided to the computer resource provisioning system, where the computer resource provisioning system provisions a resource that corresponds to the resource identifier and that has the one or more resource attributes. For example, when the resource identifier is "mydisk" and the attribute is one terabyte, the computer resource provisioning system may provision a virtual disk having a capacity of one terabyte and identified as "mydisk".

Proceeding to 708, a user identifier or an account identifier may be provided to the computing resource provisioning system. The user identifier and the account identifier may be used to bill for the use of resources. For example, billing may be based on an individual user or based on an account that has multiple users accessing the resources. Advancing to 710, a domain name system (DNS) address to access the resource may be received and the DNS address stored, at 712. Moving to 714, a handle is provided to access the resource during execution of the instruction at a client system coupled to the interface. Proceeding to 716, the DNS address is retrieved in response to a lookup operation that includes the handle. The method ends, at 718.

Figure 8:
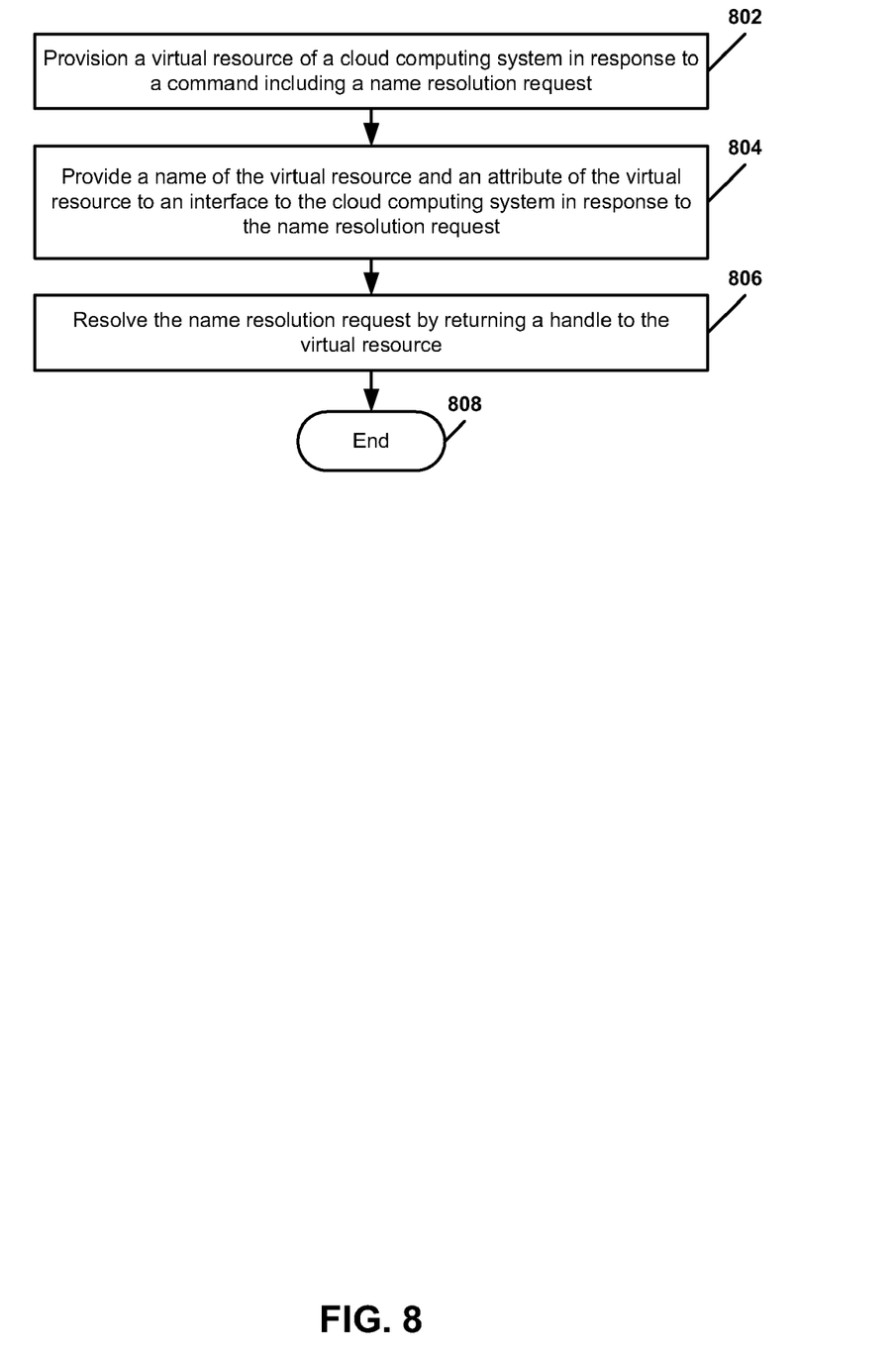
FIG. 8 is a flow diagram of a fifth illustrative embodiment of a method to provision virtual resources using name resolution.

FIG. 8 is a flow diagram of a fifth illustrative embodiment of a method to provision virtual resources using name resolution. The method may be performed by a resource provisioning system, such as the resource provisioning system 112 of FIG. 1, the provisioning system 202 of FIG. 2, or the resource provisioning system 306 of FIG. 3.

A virtual resource of a cloud computing system is provisioned in response to a command including a name resolution request, at 802. Proceeding to 804, a name of the virtual resource and an attribute of the virtual resource are provided to an interface to the cloud computing system in response to the name resolution request. Advancing to 806, the name resolution request is resolved by returning a handle to the virtual resource. The method ends at 808.

Figure 9:
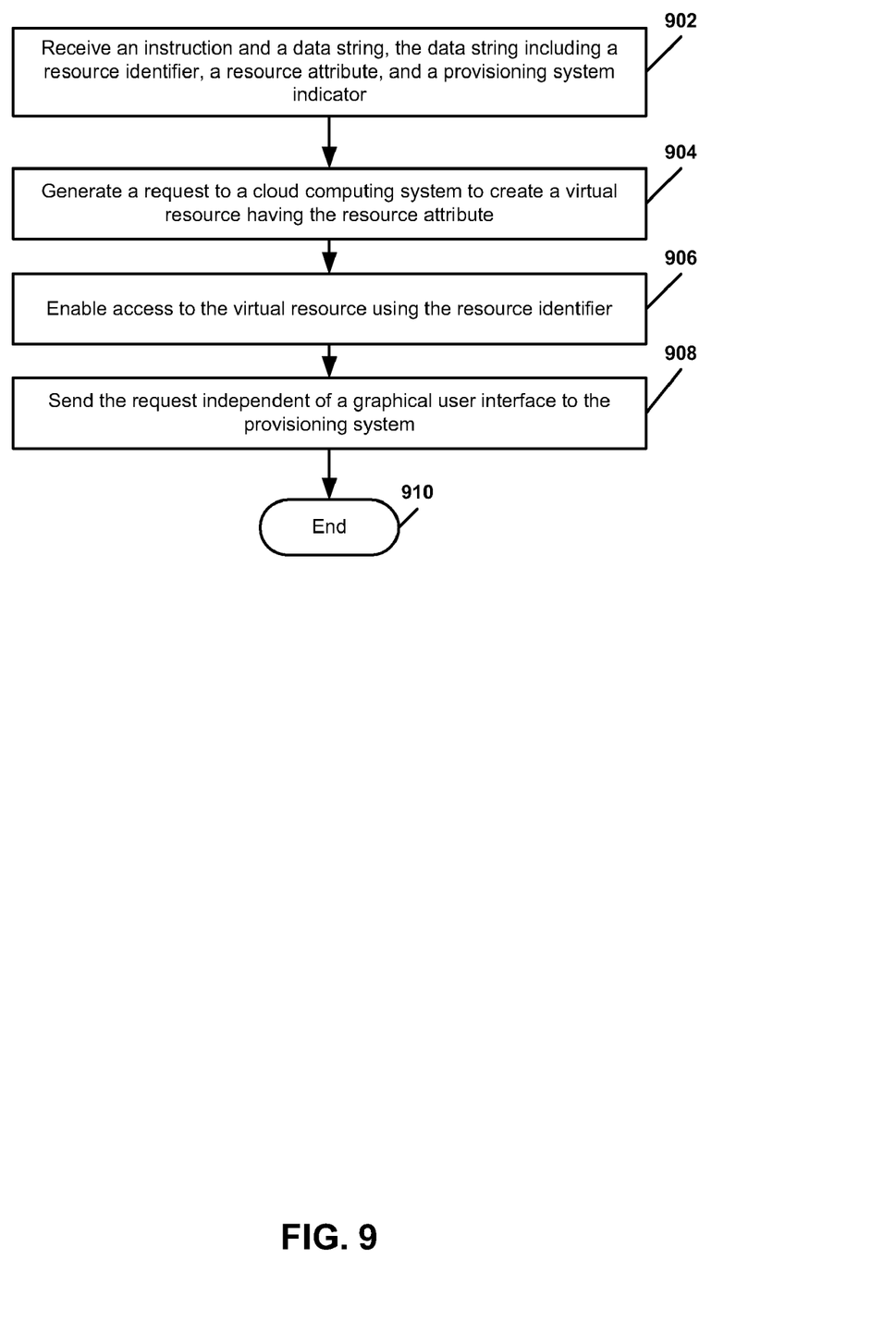
FIG. 9 is a flow diagram of a sixth illustrative embodiment of a method to provision virtual resources using name resolution.

FIG. 9 is a flow diagram of a sixth illustrative embodiment of a method to provision virtual resources using name resolution. The method may be performed by a name resolution unit, such as the name resolution unit 102 in FIG. 1, the name resolution unit 204 in FIG. 2, or the name resolution unit 314 in FIG. 3.

An instruction and a data string are received, at 902. The data string includes a resource identifier, one or more resource attributes, and a provisioning system indicator. Continuing to 904, a request is generated to a cloud computing system to create a virtual resource having the one or more resource attributes. Proceeding to 906, access to the virtual resource is enabled using the resource identifier. Advancing to 908, the request is sent to the provisioning system independent of a graphical user interface. The method ends at 910.

Figure 10:
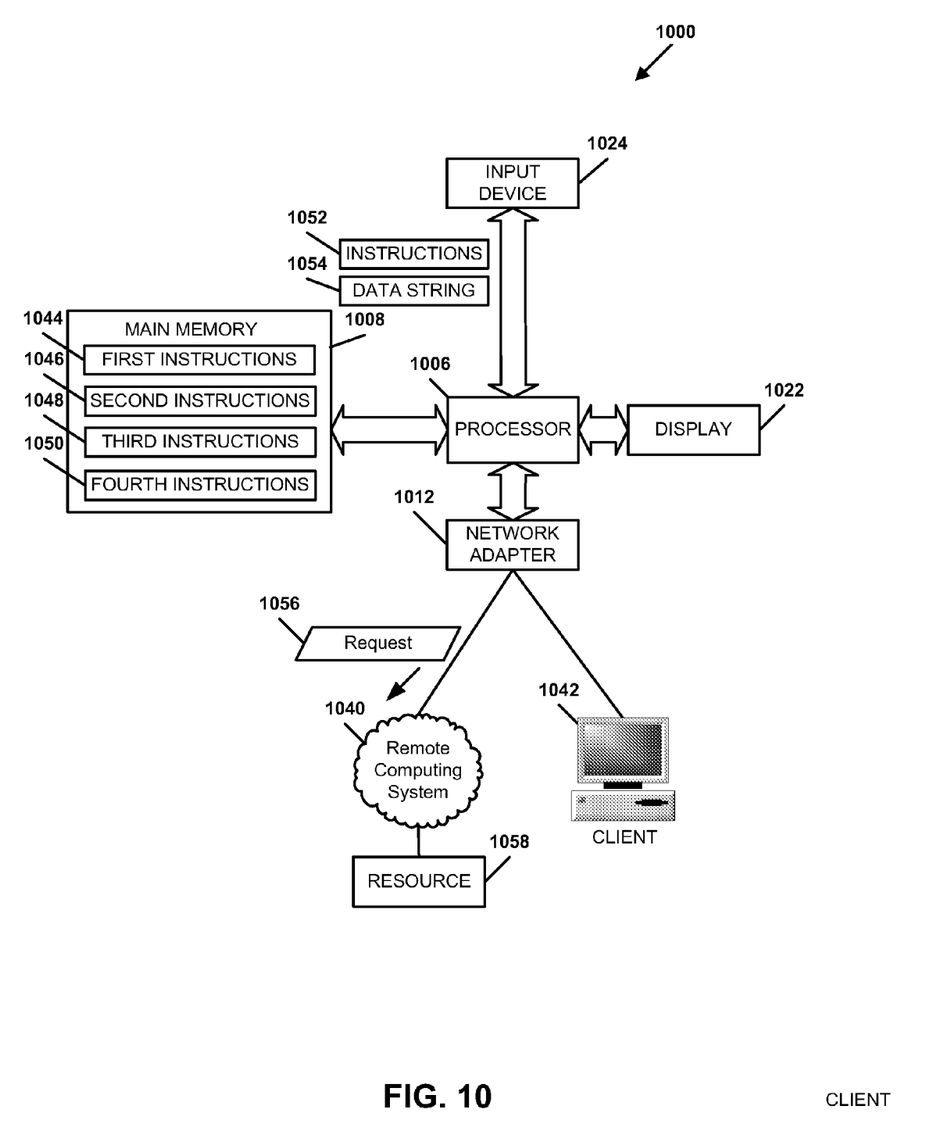
FIG. 10 is a general diagram of a fourth embodiment of a system to provision virtual resources using name resolution.

FIG. 10 is a block diagram of a computing system in which systems and methods of the present disclosure may be implemented. Computing system 1000 includes an example of a name resolution unit, such as the name resolution unit 102 in FIG. 1 or the name resolution unit 204 in FIG. 2, in which computer usable code or instructions are executable to implement the name resolution module 208, the command interface 206, and the provisioning system interface in FIG. 2.

In the depicted example, the computing system 1000 includes a processor 1006, a main memory 1008, an input device 1024 such as a keyboard or mouse, a display device 1022, and a network adapter 1012. The network adapter 1012 is coupled to a remote computing system 1040, such as the cloud computing system 106 in FIG. 1. The network adapter 1012 is also coupled to a client 1042, such as the client 104 in FIG. 1.

The main memory 1008 includes computer instructions installed onto a computer readable medium. The main memory 1008 includes first program instructions 1044 to receive an instruction 1052 and a data string 1054, the data string including a resource identifier (not shown) and one or more resource attributes (not shown). The main memory 1008 also includes second program instructions 1046 to generate a request 1056 to the remote computing system 1040 to create a virtual resource 1058 having the one or more resource attributes. The main memory 1008 also includes third program instructions 1048 to enable access to the virtual resource 1058 using the resource identifier.

The request 1056 to the remote computing system 1040 includes at least one command to an application program interface (API) of a provisioning system for an on-demand computing resource system. In FIG. 10, the API and the on-demand computing resource system are included in the remote computing system 1040 and therefore not shown. The on-demand computing resource system includes at least one set of networked computers at a data center having processing resources that are available to remote users as virtual resources that are provisioned on an on-demand basis. The main memory 1008 also includes fourth program instructions 1050 to send the request 1056 independent of a graphical user interface to the provisioning system.

An operating system (not shown) runs on the processor 1006 and coordinates and provides control of various components within the computing system 1000. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 1000 (Java and all Java-based trademarks are trademarks of Sun Microsystems, Inc. in the United States, other countries, or both).

The hardware in computing system 1000 may vary depending on the implementation. Other internal hardware or peripheral devices, such as flash memory, equivalent non-volatile memory, or optical disk drives and the like, may be used the computing system 1000 but are not illustrated in FIG. 10 for clarity of explanation. Also, the processes of the disclosed illustrative embodiments may be applied to a multiprocessor data processing system.

The depicted examples in FIG. 10 and described above are not meant to imply architectural limitations. For example, portions of the computing system 1000 also may be implemented in a personal computer, server, server cluster, tablet computer, laptop computer, or telephone device.

Particular embodiments of the computing system 1000 can take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments in FIGS. 1-10 can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method, comprising:
receiving an instruction at an interface to a computing resource provisioning system to provision a resource, wherein provisioning is performed during execution of the instruction at a client system coupled to the interface, wherein the instruction triggers a name resolution request, wherein the name resolution request includes a data string that is provided to a resolver, the resolver having regular expression rules to identify at least a first portion of the data string, wherein the resolver is configured to forward at least a second portion of the data string that is not identified by the resolver to a resolution handler and to return a result from the resolution handler that maps a virtual resource to a user-identified name; the data string including a resource identifier of a resource that does not exist prior to execution of the instruction at the client system and one or more resource attributes;
parsing the data string to extract the resource identifier and the one or more resource attributes;
providing the resource identifier and the one or more resource attributes to the computing resource provisioning system, wherein the computer resource provisioning system provisions the resource that corresponds to the resource identifier and that has the one or more resource attributes by creating a virtual resource having the one or more attributes on an on-demand basis in a cloud computing system, wherein creating the virtual resource is in response to a request to create the virtual resource having the one or more attributes sent to the computing resource provisioning system independent of a graphical user interface; and
returning a handle to provide access to the resource during execution of the instruction at the client system coupled to the interface.

2. The method of claim 1, wherein the virtual resource is associated with at least one available physical resource of the cloud computing system, the available physical resource having the one or more resource attributes, and wherein the cloud computing system comprises multiple networked computer systems that are accessible to subscribers on an on-demand basis.

3. The method of claim 1, wherein the resource is a logical processing resource that is associated with at least one physical processing unit at a multi-processing unit computer system.

4. The method of claim 1, wherein the resource is a logical memory resource that is associated with at least one physical storage device.

5. The method of claim 1, further comprising:
providing at least one of a user identifier or an account identifier to the computing resource provisioning system, and wherein the handle includes the user identifier or the account identifier.

6. The method of claim 1, wherein the computing resource provisioning system is configured to dynamically assign physical computing resources of a networked multi-computer system in response to provisioning requests.

7. The method of claim 1, wherein the resource identifier and the one or more resource attributes are provided to the computing resource provisioning system via an application programming interface (API) of the computing resource provisioning system, and further comprising:
receiving a domain name system (DNS) address to access the resource; and
storing the DNS address; and
retrieving the DNS address in response to a lookup operation that includes the handle.

8. The method of claim 1, wherein the virtual resource has a name substantially similar to the resource identifier.

9. The method of claim 1, further comprising:
creating an entry in a resource database; and
storing the handle for the virtual resource in the entry.

10. A method comprising:
provisioning a virtual resource of a cloud computing system in response to a command triggering a name resolution request, wherein the command references a resource that does not exist prior to execution of the command at a client system, and wherein provisioning is performed during runtime execution of the command at the client computer system, wherein the name resolution request includes a data string that is provided to a resolver, the resolver having regular expression rules to identify at least a first portion of the data string, wherein the resolver is configured to forward at least a second portion of the data string that is not identified by the resolver to a resolution handler and to return a result from the resolution handler that maps the virtual resource to a user-identified name; and
creating the virtual resource having the one or more attributes on an on-demand basis in a cloud computing system, wherein creating the virtual resource is in response to a request to create the virtual resource having the one or more attributes that is sent independent of a graphical user interface, and wherein the virtual resource that is created is accessible during runtime execution of the command at the client computer system.

11. The method of claim 10, wherein provisioning the virtual resource includes providing a name of the virtual resource and an attribute of the virtual resource to an interface to the cloud computing system in response to the name resolution request.

12. The method of claim 10, further comprising:
resolving the name resolution request by returning a handle to the virtual resource.

13. The method of claim 10, wherein the cloud computing system comprises multiple processors that are logically mapped to virtual processing resources that are accessible to users on an on-demand basis.

14. A system comprising:
a memory;
a processor coupled to the memory;
a command interface to receive a user command to provision a resource, wherein provisioning is performed during execution of the user command at a client system, wherein the user command triggers a name resolution request, wherein the name resolution request includes a data string argument that is provided to a resolver, the resolver having regular expression rules to identify at least a first portion of the data string argument, wherein the resolver is configured to forward at least a second portion of the data string argument that is not identified by the resolver to a resolution handler and to return a result from the resolution handler that maps a virtual resource to a user-identified name; the data string including a resource identifier of a resource that does not exist prior to execution of the user command at the client system and one or more resource attributes;
a name resolution module to parse the data string argument to extract the resource identifier of the resource that does not exist prior to execution of the user command at the client system and one or more resource attributes; and
a provisioning system interface to send a request to a provisioning system independent of a graphical user interface to create the resource having the at-least one or more resource attributes on an on-demand basis in a cloud computing system and to return a handle to the resource to the name resolution module, wherein the resource that is created is accessible during execution of the user command at the client computer system.

15. The system of claim 14, wherein the provisioning system interface is further executable by the processor to receive a domain name system (DNS) address from the provisioning system to enable access to the resource, and further comprising a resource table including at least one table entry to associate the handle with the DNS address.

16. The system of claim 15, wherein the name resolution module is executable by the processor to perform a lookup operation at the resource table using the resource identifier.

17. The system of claim 16, wherein the provisioning system interface is further configured to send a request to modify an existing resource that is associated with the resource identifier when the one or more resource attributes indicates a different number of processing units than are associated with the existing resource.

18. A computer program product comprising:
a non-transitory computer readable medium having stored thereon instructions executable by a processor to:
receive an instruction and a data string at an interface to a computing resource provisioning system to provision a resource, wherein provisioning is performed during execution of the instruction at a client system coupled to the interface, the instruction triggering a name resolution request, wherein the name resolution request includes a data string that is provided to a resolver, the resolver having regular expression rules to identify at least a first portion of the data string, wherein the resolver is configured to forward at least a second portion of the data string that is not identified by the resolver to a resolution handler and to return a result from the resolution handler that maps a virtual resource to a user-identified name; the data string including a resource identifier of a resource that does not exist prior to execution of the instruction at the client system and one or more resource attributes;
parse the data string to extract the resource identifier and the one or more resource attributes;
provide the resource identifier and the one or more resource attributes to the computing resource provisioning system, wherein the computer resource provisioning system provisions the resource that corresponds to the resource identifier and that has the one or more resource attributes by creating a virtual resource having the one or more attributes on an on-demand basis in a cloud computing system, wherein creating the virtual resource is in response to a request to create the virtual resource having the one or more attributes sent to the computing resource provisioning system independent of a graphical user interface; and
return a handle to provide access to the resource during execution of the instruction at the client system coupled to the interface.

19. The computer program product of claim 18, wherein the request the cloud computing system includes at least one command to an application program interface (API) of the computing resource provisioning system for an on-demand computing resource system, the on-demand computing resource system including at least one set of networked computers at a data center having processing resources that are available to remote users as virtual resources that are provisioned on an on-demand basis.

* * * * *